United States Patent
Yamana et al.

(10) Patent No.: US 6,355,753 B1
(45) Date of Patent: Mar. 12, 2002

(54) POLYMER AND ANTIFOULING AGENT COMPOSITION CONTAINING THE SAME

(75) Inventors: Masayuki Yamana; Ikuo Yamamoto; Norihito Otsuki; Teruyuki Fukuda, all of Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/424,215

(22) PCT Filed: May 14, 1998

(86) PCT No.: PCT/JP98/02128

§ 371 Date: Jan. 19, 2000

§ 102(e) Date: Jan. 19, 2000

(87) PCT Pub. No.: WO98/52983

PCT Pub. Date: Nov. 26, 1998

(30) Foreign Application Priority Data

May 20, 1997  (JP) ............................................. 9-129451

(51) Int. Cl.$^7$ ................................................. C08F 18/00
(52) U.S. Cl. ................................ 526/292.3; 526/292.4; 526/292.6; 526/292.7
(58) Field of Search ........................... 526/292.3, 292.4, 526/292.6, 292.7

(56) References Cited

U.S. PATENT DOCUMENTS

| | | |
|---|---|---|
| 4,925,906 A | 5/1990 | Green et al. |
| 5,015,259 A | 5/1991 | Moss, III et al. |
| 5,223,340 A | 6/1993 | Moss, III et al. |

FOREIGN PATENT DOCUMENTS

| | | |
|---|---|---|
| EP | 0395100 A2 | 10/1990 |
| GB | 1469960 | 4/1977 |
| JP | A487082 | 1/1973 |
| JP | 487082 | 1/1973 |
| JP | 4842083 | 6/1973 |
| JP | A4842083 | 6/1973 |
| JP | 5038786 | 4/1975 |
| JP | A5038786 | 4/1975 |
| JP | 5747373 | 3/1982 |
| JP | A5747373 | 3/1982 |
| JP | 57501381 | 8/1982 |
| JP | A57501381 | 8/1982 |
| JP | A57195707 | 12/1982 |
| JP | 57195707 | 12/1982 |
| JP | 2286776 | 11/1990 |
| JP | A2286776 | 11/1990 |
| JP | 5171136 | 7/1993 |
| JP | A5171136 | 7/1993 |
| JP | 83113 | 1/1996 |
| JP | A83113 | 1/1996 |
| JP | 873836 | 3/1996 |
| JP | A873836 | 3/1996 |
| WO | WO8201007 | 4/1982 |

*Primary Examiner*—Edward J. Cain
(74) *Attorney, Agent, or Firm*—Birch, Stewart, Kolasch & Birch, LLP

(57) ABSTRACT

A stainproofing polymer having: (i) a reactive group selected from the group consisting of a carboxyl group or its salt, a hydroxyl group, an epoxy group, a phosphoric acid group, an alkoxysilane group, an imine group, a sulfonic acid group, an amino group, an isocyanate group and a blocked isocyanate group; and (ii) a fluoroalkyl group, characterized in that a melting point of a monomer having a fluoroalkyl group, which constitutes the polymer, is at least 70° C. and a melting point of the stainproofing polymer is at least 50° C., gives durability capable of maintaining sufficient water- and oil-repellency after cleaning.

23 Claims, No Drawings

POLYMER AND ANTIFOULING AGENT COMPOSITION CONTAINING THE SAME

This application is the national phase under 35 U.S.C. §371 of PCT International Application No. PCT/JP98/02128 which has an International filing date of May 14, 1998, which designated the United States of America.

FIELD OF THE INVENTION

The present invention relates to a novel polymer and a stainproofing agent composition comprising the same. More particularly, the present invention relates to a polymer having a reactive group and a fluoroalkyl group, and a stainproofing agent composition containing the same, which has durability. The stainproofing agent composition of the present invention is particularly useful for a carpet.

RELATED ART

In order to impart the water repellency, oil repellency and stainproof properties to textiles (e.g. carpet), various stainproofing agents have hitherto been suggested. U.S. Pat. Nos. 4,925,906, 5,015,259 and 5,223,340 each discloses that a stainproofing agent composition comprising a copolymer containing carboxylic acid imparts the water repellency, oil repellency and stainproof properties. However, according to these copolymers, the water repellency and oil repellency after cleaning are maintained, but the stainproof properties are insufficient.

SUMMARY OF THE INVENTION

An object of the present invention is to provide a polymer imparting durability capable of maintaining sufficient water- and oil-repellency and stainproof properties before and after cleaning.

The present invention provides a stainproofing polymer having:

(i) a reactive group selected from the group consisting of a carboxyl group or its salt, a hydroxyl group, an epoxy group, a phosphoric acid group, an alkoxysilane group, an imine group, a sulfonic acid group, an amino group, an isocyanate group and a blocked isocyanate group; and (ii) a fluoroalkyl group, characterized in that:

a melting point of a monomer having a fluoroalkyl group, which constitutes the polymer, is at least 70° C. and a melting point of the stainproofing polymer is at least 50° C.

In the present description, this stainproofing polymer is referred to as a polymer (A).

The melting point of the monomer having a fluoroalkyl group is at least 70° C., and preferably at least 80° C. The melting point of the polymer (A) is at least 50° C., and preferably at least 70° C., e.g. at least 80° C.

The amount of the reactive group may be from 0.01 to 30% by weight, e.g. 0.1 to 20% by weight, based on the weight of the polymer (A). The amount of the fluoroalkyl group may be from 30 to 90% by weight, e.g. 40 to 80% by weight, based on the weight of the polymer (A).

The polymer (A) may be a copolymer obtained by copolymerization of:

(i) a monomer having a reactive group selected from the group consisting of a carboxyl group, a carboxylic anhydride group, a hydroxyl group, an epoxy group, a phosphoric acid group, an alkoxysilane group, an imine group, a sulfonic acid group, an amino group, an isocyanate group or a blocked isocyanate group, and a chlorine atom, and a carbon-carbon double bond; and (ii) a monomer having a fluoroalkyl group and a carbon-carbon double bond.

Alternatively, the polymer (A) may be a homopolymer or copolymer obtained by polymerization of a monomer having:

(a) a reactive group selected from the group consisting of a carboxyl group, a carboxylic anhydride group, a hydroxyl group, an epoxy group, a phosphoric acid group, an alkoxysilane group, an imine group, a sulfonic acid group, an amino group, an isocyanate group or a blocked isocyanate group, and a chlorine atom;

(b) a fluoroalkyl group; and (c) a carbon-carbon double bond.

The monomer constituting the polymer (A) is preferably fluorine-containing maleate or fluorine-containing fumarate.

The fluorine-containing maleate and fluorine-containing fumarate include the followings:

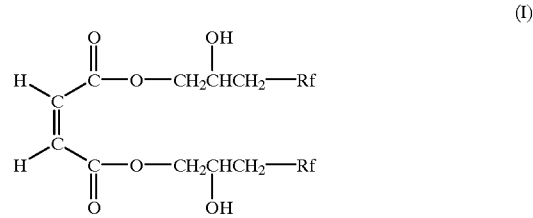

(I)

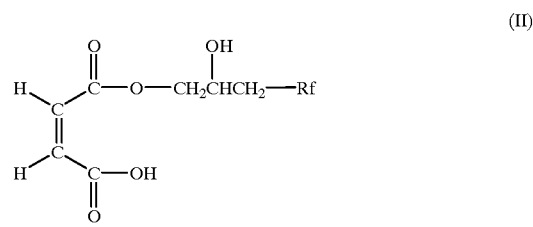

(II)

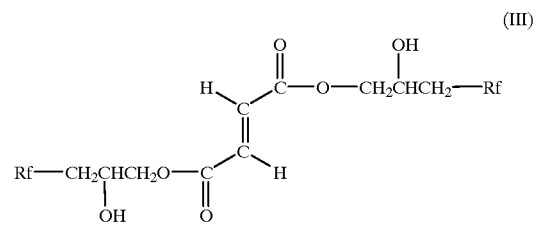

(III)

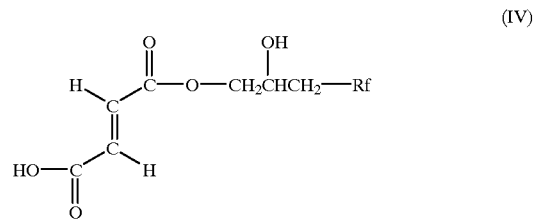

(IV)

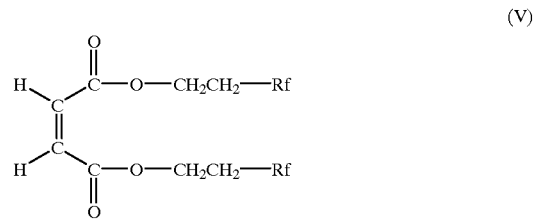

(V)

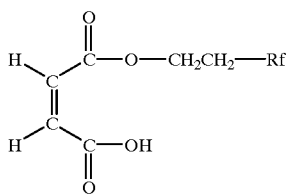
(VI)

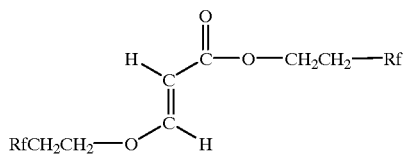
(VII)

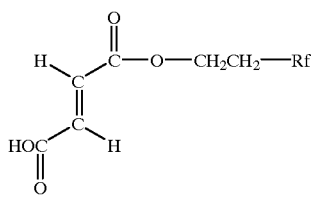
(VIII)

wherein Rf is a perfluoroalkyl group having 3 to 21 carbon atoms.

Alternatively, the monomer constituting the polymer (A) may be a compound represented by the general formula:

$$CH_2=CZ^1—CO—O—Z^2 \quad (XI)$$

wherein $Z^1$ is a hydrogen atom, an alkyl group or a —CH$_2$COOH group; $Z^2$ is a hydrogen atom, —Z$^3$—X$^1$ (with the proviso that $Z^3$ is a direct bond or an alkylene group; and $X^1$ is a carboxyl group, a hydroxyl group, an epoxy group, a phosphoric acid group, an alkoxysilane group, or a residue wherein one hydrogen is removed from one carboxyl group of dicarboxylic acid) or —CH$_2$—C(OZ$^4$)H—CH$_2$—Cl ($Z^4$ is a hydrogen atom or an acyl group); and $Z^1$ and $Z^2$ may be combined each other to form carboxylic anhydride. For example, the monomer (XI) constituting the polymer (A) may be a (meth)acrylate compound.

Specific examples of the monomer (XI) are as follows.

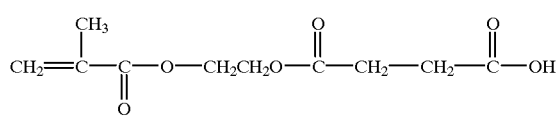

(trade name: Light Ester HO-MS (manufactured by Kyoei-Sha Chemical Co., Ltd.))

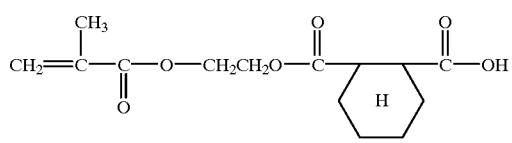

(trade name: Light Ester HO-HH (manufactured by Kyoei-Sha Chemical Co., Ltd.))

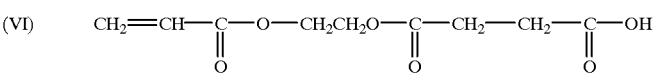

(trade name: Light Ester HOA-MS (manufactured by Kyoei-Sha Chemical Co., Ltd.))

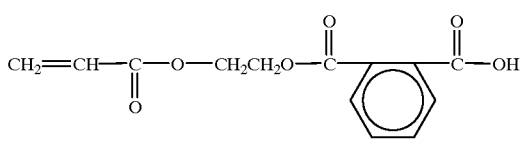

(trade name: Light Ester HOA-MPL (manufactured by Kyoei-Sha Chemical Co., Ltd.))

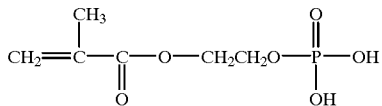

(trade name: Light Ester PM (manufactured by Kyoei-Sha Chemical Co., Ltd.))

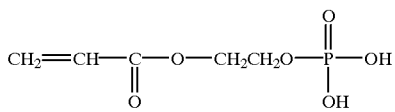

(trade name: Light Ester PA (manufactured by Kyoei-Sha Chemical Co., Ltd.))

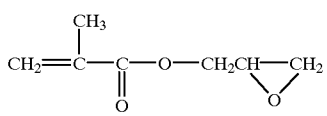

(trade name: Light Ester G (manufactured by Kyoei-Sha Chemical Co., Ltd.))

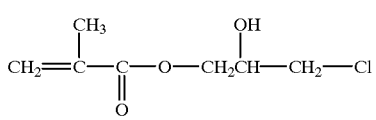

(trade name: Light Ester CL (manufactured by Kyoei-Sha Chemical Co., Ltd.))

(trade name: SZ6030 (manufactured by Toray Dow Corning Silicone Co., Ltd.))

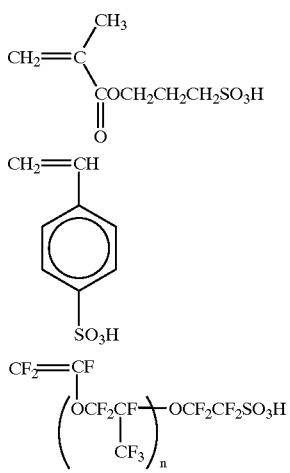

(n=1 to 20) (sulfonic acid-group containing monomer)

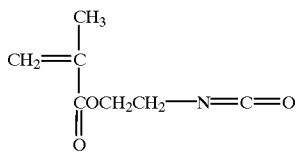

(Isocyanate Group-containing Monomer)

The monomer (XI) having a reactive group is copolymerized with a monomer (XII) having a fluoroalkyl group to obtain the polymer (A) of the present invention.

In the polymer (A), the amount of the monomer (XI) may be from 0.01 to 30% by weight, e.g. 0.1 to 20% by weight, based on the weight of the copolymer (A), while the amount of the monomer (XII) may be from 30 to 90% by weight, e.g. from 40 to 80% by weight, based on the weight of the copolymer (A).

The fluoroalkyl group in the monomer (XII) having the fluoroalkyl group may be a perfluoroalkyl group. The monomer (XII) may be a (meth)acrylate containing a fluoroalkyl group having 3 to 21 carbon atoms. The monomer (XII) maybe a compound represented by the general formula:

wherein Rf is a straight-chain or branched fluoroalkyl group having 3 to 20 carbon atoms; $R^1$ is a straight-chain or branched alkylene group having 1 to 20 carbon atoms, a —$CON(R^3)$—$R^4$— group, a —$SO_2N(R^3)R^4$— group or a —$CH_2CH(OR^5)$—$CH_2$— group (with the proviso that $R^3$ is an alkyl group having 1 to 10 carbon atoms, $R^4$ is a straight-chain or branched alkylene group having 1 to 10 carbon atoms, and $R^5$ is a hydrogen atom or an acyl group having 1 to 10 carbon atoms); and $R^2$ is a hydrogen atom or a methyl group.

Examples of the monomer (XII) having a fluoroalkyl group are as follows:

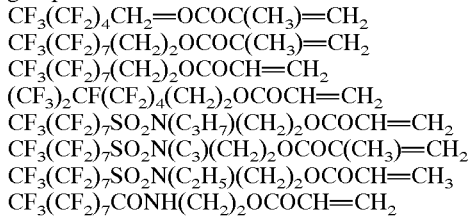

$CF_3(CF_2)_4CH_2$=$OCOC(CH_3)$=$CH_2$
$CF_3(CF_2)_7(CH_2)_2OCOC(CH_3)$=$CH_2$
$CF_3(CF_2)_7(CH_2)_2OCOCH$=$CH_2$
$(CF_3)_2CF(CF_2)_4(CH_2)_2OCOCH$=$CH_2$
$CF_3(CF_2)_7SO_2N(C_3H_7)(CH_2)_2OCOCH$=$CH_2$
$CF_3(CF_2)_7SO_2N(C_3)(CH_2)_2OCOC(CH_3)$=$CH_2$
$CF_3(CF_2)_7SO_2N(C_2H_5)(CH_2)_2OCOCH$=$CH_3$
$CF_3(CF_2)_7CONH(CH_2)_2OCOCH$=$CH_2$
$(CF_3)_2CF(CF_2)_6(CH_2)_3OCOCH$=$CH_2$
$(CF_3)_2CF(CF_2)_6CH_2CH(OCOCH_3)CH_2OCOC(CH_3)$=$CH_2$
$(CF_3)_2CF(CF_2)_6CH_2CH(OH)CH_2OCOCH$=$CH_2$
$CF_3(CF_2)_9(CH_2)_2OCOCH$=$CH_2$
$CF_3(CF_2)_9(CH_2)_2OCOC(CH_3)$=$CH_2$
$CF_3(CF_2)_9CONH(CH_2)_2OCOC(CH_3)$=$CH_2$

The polymer (A) may have an adherent group capable of accelerating adhesion of the polymer to the substrate to be treated. The adherent group includes, for example, a chlorine atom, a urethane group, an amide group and an ester group. The adherent group can be introduced into the polymer (A) by polymerizing the monomer having the adherent group. In the polymer (A), a monomer having a reactive group, a fluoroalkyl group and an adherent group may be used.

Specific examples of the monomer having an adherent group include the followings: vinyl chloride,

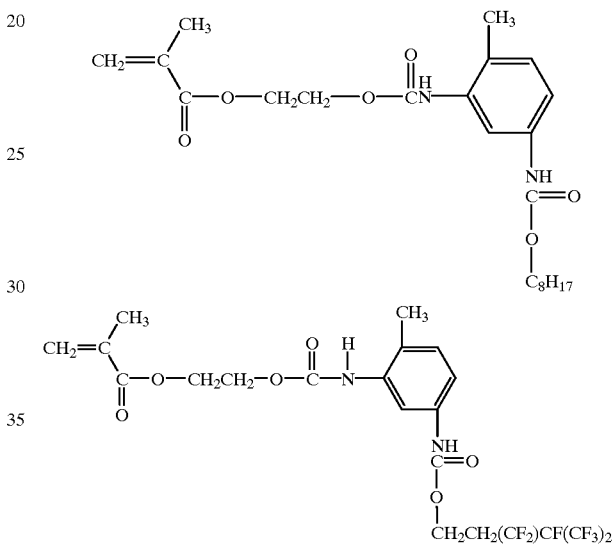

The amount of the adherent group may be from 0.1 to 50% by weight based on the weight of the polymer (A).

The stainproofing agent composition of the present invention comprises the polymer (A) and other polymer (B).

The polymer (B) comprises:

(B-I) a repeating unit derived from a (meth)acrylate ester having a fluoroalkyl group.

If necessary, the polymer (B) may further comprise:.

(B-II) a repeating unit derived from a monomer containing an unsaturated dicarboxylic acid or unsaturated carboxylic anhydride, (B-III) a repeating unit derived from a monomer having a functional group selected from the group consisting of an epoxy group, a phosphoric acid group, an alkoxysilane group, a hydroxyl group, an imine group and a chlorine atom, or vinyl chloride, or (B-IV) a repeating unit derived from a (meth)acrylate ester having an alkyl group, in addition to the repeating unit (B-I).

The polymer (B) may be:
a homopolymer having a repeating unit (B-I),
a copolymer having repeating units (B-I) and (B-II),
a copolymer having repeating units (B-I) and (B-III),
a copolymer having repeating units (B-I) and (B-IV),
a copolymer having repeating units (B-I), (B-II) and (B-III), a copolymer having repeating units (B-I), (B-II) and (B-IV), or a copolymer having repeating units (B-I) to (B-IV).

The fluoroalkyl group contained in the monomer (B-I), which is a repeating unit of the copolymer (B), is preferably a perfluoroalkyl group.

The monomer (B-I) having a fluoroalkyl group may be a (meth)acrylate ester containing a fluoroalkyl group having 3 to 21 carbon atoms. The monomer (B-I) may be a compound represented by the general formula:

$$Rf-R^1-OCOC(R^2)=CH_2$$

wherein Rf is a straight-chain or branched fluoroalkyl group having 3 to 20 carbon atoms;
$R^1$ is a straight-chain or branched alkylene group having 1 to 20 carbon atoms, a $-CON(R^3)-R^4-$ group, a $-SO_2N(R^3)R^4-$ group or a $-CH_2CH(OR^5)-CH_2-$ group (with the proviso that $R^3$ is an alkyl group having 1 to 10 carbon atoms, $R^4$ is a straight-chain or branched alkylene group having 1 to 10 carbon atoms, $R^5$ is a hydrogen atom or an acyl group having 1 to 10 carbon atoms); and
$R^2$ is a hydrogen atom or a methyl group.

Examples of the monomer (B-I) having a fluoroalkyl group are as follows:
$CF_3(CF_2)_4CH_2=OCOC(CH_3)=CH_2$
$CF_3(CF_2)_7(CH_2)_2OCOC(CH_3)=CH_2$
$CF_3(CF_2)_7(CH_2)_2OCOCH=CH_2$
$(CF_3)_2CF(CF_2)_4(CH_2)_2OCOCH=CH_2$
$CF_3(CF_2)_7SO_2N(C_3H_7)(CH_2)_2OCOCH=CH_2$
$CF_3(CF_2)_7SO_2N(C_3)(CH_2)_2OCOC(CH_3)=CH_2$
$CF_3(CF_2)_7SO_2N(C_2H_5)(CH_2)_2OCOCH=CH_3$
$CF_3(CF_2)_7CONH(CH_2)_2OCOCH=CH_2$
$(CF_3)_2CF(CF_2)_6(CH_2)_3OCOCH=CH_2$
$(CF_3)_2CF(CF_2)_6CH_2CH(OCOCH_3)CH_2OCOC(CH_3)=CH_2$
$(CF_3)_2CF(CF_2)_6CH_2CH(OH)CH_2OCOCH=CH_2$
$CF_3(CF_2)_9(CH_2)_2OCOCH=CH_2$
$CF_3(CF_2)_9(CH_2)_2OCOC(CH_3)=CH_2$
$CF_3(CF_2)_9CONH(CH_2)_2OCOC(CH_3)=CH_2$ Specific examples of the monomer (B-II) constituting the copolymer (B) include maleic acid, maleic anhydride, fumaric acid, fumaric anhydride, citraconic acid, citraconic anhydride, itaconic acid and itaconic anhydride.

The monomer (B-III), which may be contained in the polymer (B), may be vinyl chloride ($CH_2=CHCl$), or a compound represented by the general formula:

$$CH_2=CA^3-CO-O-A^4$$

wherein $A^3$ and $A^4$ are a hydrogen atom, an alkyl group or $-A^5-X^2$ (with the proviso that $A^5$ is a direct bond or an alkylene group, and $X^2$ is an epoxy group, a phosphoric acid group or an alkoxysilane group) or $-CH_2-C(OA^6)H-CH_2-Cl$ ($A^6$ is a hydrogen atom or an acyl group).

Specific examples of the monomer (B-III) are the same as those described in the monomer (XI) constituting the polymer (A).

The monomer constituting the repeating unit (B-IV) may be a (meth)acrylate ester having an alkyl group. The number of carbon atoms of the alkyl group is from 1 to 30, e.g. 6 to 30, for example, 10 to 30. The monomer constituting the repeating unit (B-IV) may be acrylate esters represented by the general formula:

$$CH_2=CA^1COOA^2$$

wherein $A^1$ is a hydrogen atom or a methyl group, and $A^2$ is an alkyl group represented by $C_nH_{2n+1}$ (n=1 to 30). By copolymerizing these monomers, various properties such as water- and oil-repellency, stainproof properties and cleaning fastness thereof, laundering fastness, wear resistance, solubility in solvent, hardness and feel can be improved, if necessary.

In the polymer (B), the amount of the monomer (B-II) is not more than 30 parts by weight, particularly from 30 to 0.01 parts by weight, e.g. 20 to 0.01 parts by weight, based on 100 parts by weight of the monomer (B-I). The amount of the monomer (B-III) is not more than 50 parts by weight, particularly from 50 to 0.01 parts by weight, e.g. 30 to 0.1 parts by weight, based on 100 parts by weight of the monomer (B-I). The amount of the monomer (B-IV) is not more than 50 parts by weight, particularly from 50 to 0.1 parts by weight, e.g. 30 to 0.1 parts by weight, based on 100 parts by weight of the monomer (B-I).

In the stainproofing agent composition, a weight ratio of the polymer (A) to the polymer (B) is from 1:99 to 99:1, e.g. 70:30 to 30:70.

The stainproofing agent composition may further contain a compound containing no fluorine atom. The stainproofing agent composition may further contain a compound derived from a saturated dicarboxylic acid or saturated carboxylic anhydride having a fluoroalkyl group.

The polymers (A) and (B) in the present invention can be produced by any polymerization method, and the conditions of the polymerization reaction can be arbitrary selected. The polymerization method includes, for example, solution polymerization and emulsion polymerization. Among them, emulsion polymerization is particularly preferred.

The average molecular weight of the polymers (A) and (B) may be from 1,000 to 10,000,000.

The method for production of the polymer (A) will be described in detail below.

A stable emulsion can be obtained by adding water and an emulsifying agent to a monomer, followed by emulsification (e.g. mechanical emulsification) and then polymerization. When using a solvent (e.g. ketone such as methyl ethyl ketone (MEK); succinic diester such as diethyl succinate; chlorine-containing organic solvents such as perchloroethylene; glycol ethers such as dipropylene glycol monomethyl ether; and glycols such as dipropylene glycol) in which the monomer is soluble, the solution polymerization can be conducted.

The emulsion polymerization may be conducted by polymerizing a monomer in an aqueous medium in the presence of an emulsifying agent. The aqueous medium is generally water alone, but it may contain 20% by weight or less of an organic solvent (e.g. glycols such as dipropylene glycol; glycol ethers such as dipropylene glycol monomethyl ether; ketones such as methyl ethyl ketone; and succinic acid diesters such as diethyl succinate). The emulsifying agent may be any of cationic, anionic and nonionic emulsifying agents. The emulsifying agent includes, for example, a cationic emulsifying agent such as stearyltrimethylammonium chloride; an anionic emulsifying agent such as sodium lauryl sulfate; and a nonionic emulsifying agent such as polyoxyethylene alkyl phenyl ether. A polymerization initiator is used to initiate the polymerization. The polymerization initiator includes, for example, azobisisobutyronitrile, azobis 2-aminodipropane dihydrochloride and ammonium persulfate. The polymerization temperature is usually from 60 to 80° C. The polymerization time depends on the polymerization temperature, but is usually from 1 to 10 hours.

The method for production of the polymer (B) will be described in detail below.

In the solution polymerization, there can be used a method of dissolving a monomer in an organic solvent in the presence of a polymerization initiator, and stirring the mixture with heating at the temperature within the range from 50 to 120° C. for 1 to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator is used in the amount within the range from 0.01 to 5 parts by weight based on 100 parts by weight of the monomer.

The organic solvent is inert to the monomer and dissolves them, and examples thereof include pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 1000 parts by weight based on 100 parts by weight of the monomer.

In the emulsion polymerization, there can be used a method of emulsifying a monomer in water in the presence of a polymerization initiator and an emulsifying agent, replacing by nitrogen, and copolymerizing with stirring at the temperature within the range from 50 to 80° C. for 1 to 10 hours. As the polymerization initiator, for example, water-soluble initiators (e.g. benzoyl peroxide, lauroyl peroxide, t-butyl perbenzoate, 1-hydroxycyclohexyl hydroperoxide, 3-carboxylpropionyl peroxide, acetyl peroxide, azobisisobutylamidine dihydrochloride, azobisisobutyronitrile, sodium peroxide, potassium persulfate and ammonium persulfate) and oil-soluble initiators (e.g. azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator is used in the amount within the range from 0.01 to 5 parts by weight based on 100 parts by weight of the monomer.

In order to obtain a copolymer dispersion in water, which is superior in storage stability, it is desirable that the monomers are atomized in water by using an emulsifying device capable of applying a strong shattering energy (e.g. high-pressure homogenizer and ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The anionic and/or nonionic and/or cationic emulsifying agents are preferably used. When the monomers are not completely compatibilized, a compatibilizing agent capable of sufficiently compatibilizing them (e.g. a water-soluble organic solvent and a low-molecular weight monomer) is preferably added to these monomers. By the addition of the compatibilizing agent, the emulsifiability and copolymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol and may be used in the amount within the range from 1 to 50 parts by weight, e.g. from 10 to 40 parts by weight, based on 100 parts by weight of water. Examples of the low-molecular weight monomer include methyl methacrylate, glycidyl methacrylate and 2,2,2-trifluoroethyl methacrylate, and may be used in the amount within the range from 1 to 50 parts by weight, e.g. from 10 to 40 parts by weight, based on 100 parts by weight of the whole monomer.

The stainproofing agent composition may be in the form of a solution, emulsion or aerosol.

The stainproofing agent composition may be the form of an aqueous dispersion wherein all polymers are dispersed in a medium mainly containing water. Also, it may be in the form of an aqueous dispersion wherein the polymer is dispersed in a medium mainly containing water in the presence of nonionic and/or anionic and/or cationic emulsifying agents.

The treating agent of the present invention is prepared in any form such as emulsion, solvent solution or the like in accordance with a conventional method. For example, an aqueous emulsion-type composition is prepared by the above-described emulsion polymerization method, and a solvent solution-type composition is prepared by the above-described solution polymerization method.

A liquid containing the polymer (A) and a liquid containing the polymer (B), prepared separately, are mixed and, if necessary, a medium (e.g. water or organic solvent) is added to the mixture liquid to give a stainproofing agent.

The stainproofing agent of the present invention can be applied to the surface of the substrate to be treated by a conventionally known method. There can be normally employed a method of dispersing and diluting the stainproofing agent with the organic solvent or water, applying the solution to the surface of the substrate to be treated by a known method (e.g. dip coating, spray coating, foam coating, etc. to carpet fabric, carpet yarn or raw cotton and dried). If necessary, the carpet fabric or carpet yarn may be subjecting to a steam treatment before application of the stainproofing agent. The stainproofing agent may be applied together with a suitable crosslinking agent, followed by curing. It is also possible to add other water-repellents and oil-repellents, and mothproofing agents, softeners, antimicrobial agents, flame retardants, antistatic agents, paint fixing agents, crease-proofing agents, etc. to the stainproofing agent of the present invention and to use them in combination. In case of the dip coating, the concentration of the copolymer in the dipping liquid may be from 0.05 to 10% by weight. In case of the spray coating, the concentration of the copolymer in the treatment liquid may be from 0.1 to 5% by weight. A stain blocker may be used in combination. When using the stain blocker, the anionic or nonionic emulsifying agent is preferably used.

The substrate to be treated with the stainproofing agent of the present invention is preferably a textile, particularly a carpet. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers. The stainproofing agent of the present invention can be suitably used in carpets made of nylon and polypropylene because of excellent resistance to a detergent solution and brushing (mechanical).

The textile may be in any form such as fiber and fabric. When the carpet is treated with the stainproofing agent of the present invention, the carpet may be formed after treating fibers or yarns with the stainproofing agent, or the formed carpet may be treated with the stainproofing agent of the present invention. Examples of the substrate to be treated with the stainproofing agent of the present invention include glass, paper, wood, hide, fur, asbestos, brick, cement, metal and oxide, ceramics, plastic, coated surface and plaster, in addition to the textile.

PREFERRED EMBODIMENT OF THE INVENTION

The following Examples and Comparative Examples further illustrate the present invention in detail but are not to be construed to limit the scope thereof. In the Examples and Comparative Example, parts are by weight unless otherwise specified.

The stainproofing agents obtained in the Examples and Comparative Examples were evaluated as follows. Each of polymer solutions obtained in the Examples and Comparative Examples was diluted with water to prepare a liquid having a solid content of 3%, which is taken as a treatment liquid. A carpet fabric may be subjected to a steam treatment (100° C.×10 minutes) before applying the treatment liquid. This treatment liquid is sprayed on a nylon loop-pile carpet fabric (non-backed product) in a treatment amount of 75 g/m$^2$, and the treated carpet fabric is dried with heating at 130° C. for 7 minutes. The water repellency, oil repellency, stainproof properties and fluorine content before and after cleaning test are evaluated.

Cleaning Test

The cleaning test was conducted in accordance with the method defined in AATCC-TM-138-1992, and the water repellency, oil repellency, stainproof properties and F content before and after cleaning test were evaluated.

(1) Water repellency

The water repellency is determined by softly dropping small drops of a isopropyl alcohol/water mixture liquid having the composition shown in Table I on the surface of a carpet cloth, and expressing by maximum content of isopropyl alcohol in the liquid which remains in the form of drops after 3 minutes.

TABLE I

| Mixture composition (volume ratio %) | |
|---|---|
| Isopropyl alcohol | Water |
| 60 | 40 |
| 50 | 50 |
| 40 | 60 |
| 30 | 70 |
| 20 | 80 |
| 10 | 90 |
| 0 | 100 |

(2) Oil repellency

The oil repellency is determined according to AATCC-TM-118-1966 by dropping several drops (diameter: about 4 mm) of a test solution shown in Table II on two positions of the surface of a test cloth and observing the penetration state of the drops after 30 seconds. A maximum point of the oil repellency given by the test solution causing no penetration is taken as the oil repellency.

TABLE II

| Oil repellency | Test solution | Surface tension (dyn/cm, 25° C.) |
|---|---|---|
| 8 | n-Heptane | 20.0 |
| 7 | n-Octane | 21.8 |

TABLE II-continued

| Oil repellency | Test solution | Surface tension (dyn/cm, 25° C.) |
|---|---|---|
| 6 | n-Decane | 23.5 |
| 5 | n-Dodecane | 25.0 |
| 4 | n-Tetradecane | 26.7 |
| 3 | n-Hexadecane | 27.3 |
| 2 | Miture of hexadecane/ nujol (35/65 by weight) | 29.6 |
| 1 | Nujol | 31.2 |
| 0 | Inferior to 1 | — |

(3) Stainproof properties

The stainproof property test is conducted in accordance with AATCC-TM-123-1989. A carpet is stained with a dry soil having the composition shown in Table III.

TABLE III

| Component | Weight ratio (%) |
|---|---|
| Peat moss | 38 |
| Portland cement | 17 |
| White clay | 17 |
| Silica (200 mesh) | 17 |
| Carbon black | 1.75 |
| Iron (III) oxide for ferrite | 0.50 |
| Mineral oil (pharmaceutic grade) | 8.75 |

After the excess dry soil on the surface is sucked with an electrical cleaner, brightness of the surface is measured by a colorimeter and dry soiling stainproof properties is evaluated in accordance with AATCC Evaluation Procedure 2.

(4) Fluorine content (F content)

After 25 mg of a carpet fiber was cut, the F content is measured by a combustion method using an F ion-selective electrode.

The residual percentage of the F content is calculated from the following equation, thereby to evaluate the F content. Residual percentage (%) of F content=F/F$_0$×100 wherein F$_0$: F content (ppm) of fiber before cleaning F: F content (ppm) of fiber after cleaning.

(5) Melting point

The melting point is measured by DSC-50 (manufactured by Shimadzu Corp.).

Preparation of a monomer having an Rf group and a carboxylic group is shown below.

Synthesis Example 1

In a 500 ml flask equipped with a stirrer, a thermometer and a dropping funnel, 32.7 g of maleic acid and 267.3 g of 3-perfluoroalkyl-1,2-epoxypropane (Rf epoxy) having a structure of:

were dissolved with heating at 150° C., and then reacted with stirring for 8 hours. It was confirmed by gas chromatography that unreacted Rf epoxy does not remain, and the reaction was terminated. It was confirmed by gas chromatography that the resulting product 1 is a mixture of the following compounds (1) and (2) in a weight ratio of 8:2. Also the structure was confirmed by mass spectrum. The melting point of the resulting mixture of the compounds (1) and (2) was 116° C.

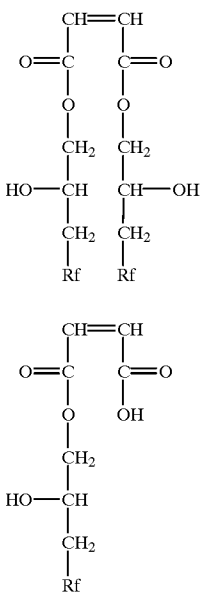

(1)

(2)

Synthesis Example 2

In a 500 ml flask equipped with a stirrer, a thermometer and a dropping funnel, 46.6 g of maleic acid and 253.4 g of 3-perfluoroalkyl-1,2-epoxypropane (Rf epoxy) used in Synthesis Example 1 were dissolved with heating at 150° C., and then reacted with stirring for 8 hours. It was confirmed by gas chromatography that unreacted Rf epoxy does not remain, and the reaction was terminated. It was confirmed by gas chromatography that the resulting product 2 is a mixture of the following compounds (1) and (2) in a weight ratio of 2:8. Also the structure was confirmed by mass spectrum. The melting point of the resulting mixture of the compounds (1) and (2) was 108° C.

Preparative Example 1

Polymerization of Product 1/MMA Copolymer (Emulsion A)

A product 1 obtained in Synthesis Example 1, methyl methacrylate (MMA), pure water, n-laurylmercaptan (LSH), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by an ultrasonic emulsifier. The resulting emulsion was charged in a 1 liter four-necked flask equipped with a reflux condenser, a nitrogen introducing tube, a thermometer and a stirrer, and then dissolved oxygen was removed by replacing the atmosphere in the flask by nitrogen. Thereafter, ammonium persulfate (APS) as an initiator was charged in the amount shown in Table IV. Under stirring, the copolymerization reaction was conducted at 60° C. for 8 hours to obtain a copolymer emulsion A. The melting point of the copolymer was 118° C.

Preparative Example 2

Polymerization of Product 2/MMA Copolymer (Emulsion B)

A product 2 obtained in Synthesis Example 2, methyl methacrylate (MMA), pure water, n-laurylmercaptan (LSH), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by an ultrasonic emulsifier. The resulting emulsion was charged in a 1 liter four-necked flask equipped with a reflux condenser, a nitrogen introducing tube, a thermometer and a stirrer, and then dissolved oxygen was removed by replacing the atmosphere in the flask by nitrogen. Thereafter, ammonium persulfate (APS) as an initiator was charged in the amount shown in Table IV. Under stirring, the copolymerization reaction was conducted at 60° C. for 8 hours to obtain a copolymer emulsion B. The melting point of the copolymer was 115° C.

Preparative Example 3

Polymerization of SFA/StA/ACi Copolymer (Emulsion C)

$CH_2=CHCOO(CH_2)_2(CF_2CF_2)_nCF_2CF_3$ (SFA, mixture of compounds wherein n=3, 4 and 5 in a weight ratio of 5:3:1), stearyl acrylate (StA), citraconic anhydride (Aci), pure water, n-laurylmercaptan (LSH), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by an ultrasonic emulsifier. The resulting emulsion was charged in a 1 liter four-necked flask equipped with a reflux condenser, a nitrogen introducing tube, a thermometer and a stirrer, and then dissolved oxygen was removed by replacing the atmosphere in the flask by nitrogen. Thereafter, ammonium persulfate (APS) as an initiator was charged in the amount shown in Table IV. Under stirring, the copolymerization reaction was conducted at 60° C. for 8 hours to obtain a copolymer emulsion C.

Preparative Example 4

Polymerization of SFA/StA/ACi/VCl Copolymer (Emulsion D)

$CH_2=CHCOO(CH_2)_2(CF_2CF_2)_nCF_2CF_3$ (SFA, a mixture of compounds wherein n=3, 4 and 5 in a weight ratio of 5:3:1), stearyl acrylate (StA), citraconic anhydride (ACi), pure water, n-laurylmercaptan (LSH), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by an ultrasonic emulsifier. The resulting emulsion was charged in a 1 liter autoclave, and then dissolved oxygen was removed by replacing the atmosphere by nitrogen. Thereafter, vinyl chloride (VCl) having a purity of 99% was charged in the amount shown in Table IV and then ammonium persulfate (APS) as an initiator was charged in the amount shown in Table IV. Under stirring, the copolymerization reaction was conducted at 60° C. for 8 hours to obtain a copolymer emulsion D. The melting point of the copolymer was 75° C.

Preparative Example 5

Polymerization of SFA/StA/Ci Copolymer (Emulsion E)

$CH_2=CHCOO(CH_2)_2(CF_2CF_2)_nCF_2CF_3$ (SFA, a mixture of compounds wherein n=3, 4 and 5 in a weight ratio of 5:3:1), stearyl acrylate (StA), itaconic anhydride (Ci), pure water, n-laurylmercaptan (LSH), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by an ultrasonic emulsifier. The resulting emulsion was charged in a 1 liter four-necked flask equipped with a reflux condenser, a nitrogen introducing tube, a thermometer and a stirrer, and then dissolved oxygen was removed by replacing the atmosphere in the flask by nitrogen. Thereafter, ammonium persulfate (APS) as an initiator was charged in the amount shown in Table IV. Under stirring, the copolymerization reaction was conducted at 60° C. for 8 hours to obtain a copolymer emulsion E.

Preparative Example 6

Polymerization of SFA/StA/Ci/VCl Copolymer (Emulsion F)

$CH_2=CHCOO(CH_2)_2(CF_2CF_2)_nCF_2CF_3$ (SFA, a mixture of compounds wherein n=3, 4 and 5 in a weight ratio of 5:3:1), stearyl acrylate (StA), itaconic anhydride (Ci), pure water, n-laurylmercaptan (LSH), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by an ultrasonic emulsifier. The resulting emulsion was charged in a 1 liter autoclave, and then dissolved oxygen was removed by replacing the atmosphere by nitrogen. Thereafter, vinyl chloride (VCl) having a purity of 99% was charged in the amount shown in Table IV and ammonium persulfate (APS) as an initiator was charged in the amount shown in Table IV. Under stirring, the copolymerization reaction was conducted at 60° C. for 8 hours to obtain a copolymer emulsion F.

Preparative Example 7

Polymerization of vinyl Chloride-containing FA/StA Copolymer Anionic Emulsion (Emulsion G)

$CH_2=CHCOO(CH_2)_2(CF_2CF_2)_nCF_2CF_3$ (SFA, a mixture of compounds wherein n=3, 4 and 5 in a weight ratio of 5:3:1), stearyl acrylate (StA), 2-hydroxyethyl methacrylate (2EHA), diacetoneacrylamide (DAAM, crosslinking monomer), 3-chloro-2-hydroxypropyl methacrylate (Topolen M), deionized water, n-laurylmercaptan (LSH, chain transfer agent), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by a high pressure homogenizer. The resulting emulsion was charged in a 1 liter autoclave, and then dissolved oxygen was removed by replacing the atmosphere by nitrogen. Thereafter, vinyl chloride (VCl) having a purity of 99% was charged in the amount shown in Table IV and ammonium persulfate (APS) as an initiator was charged in the amount shown in Table IV. Under stirring, the copolymerization reaction was conducted at 60° C. for 8 hours to give a vinyl chloride-containing copolymer emulsion G having a solid content of 33% by weight.

Polymerization of 99% or more was confirmed by the gas chromatography analysis.

Comparative Preparative Example 1

Polymerization of SFA/StA Copolymer (Emulsion H)

$CH_2=CHCOO(CH_2)_2(CF_2CF_2)_nCF_2CF_3$ (SFA, a mixture of compounds wherein n=3, 4 and 5 in a weight ratio of 5:3:1), stearyl acrylate (StA), pure water, n-laurylmercaptan (LSH), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by an ultrasonic emulsifier. The resulting emulsion was charged in a 1 liter four-necked flask equipped with a reflux condenser, a nitrogen introducing tube, a thermometer and a stirrer, and then dissolved oxygen was removed by replacing the atmosphere in the flask by nitrogen. Thereafter, ammonium persulfate (APS) as an initiator was charged in the amount shown in Table IV. Under stirring, the copolymerization reaction was conducted at 60° C. for 8 hours to obtain a copolymer emulsion H. The melting point of the copolymer was 46° C.

Comparative Preparative Example 2

Polymerization of SFA/StA/VCl Copolymer (Emulsion I)

$CH_2=CHCOO(CH_2)_2(CF_2CF_2)_nCF_2CF_3$ (SFA, a mixture of compounds wherein n=3, 4 and 5 in a weight ratio of 5:3:1), stearyl acrylate (StA), pure water, n-laurylmercaptan (LSH), polyoxyethylene alkyl phenyl ether sulfate ammonium (Hitenol N-17, anionic emulsifying agent), polyoxyethylene alkyl phenyl ether (Nonion HS-220, nonionic emulsifying agent), polyoxyethylene sorbitan monolaurate (Nonion LT-221, nonionic emulsifying agent) and dipropylene glycol monomethyl ether (DPM) were mixed in each amount shown in Table IV to prepare a mixture liquid.

This mixture liquid was dissolved with heating and emulsified by an ultrasonic emulsifier. The resulting emulsion was charged in a 1 liter autoclave, and then dissolved oxygen was removed by replacing the atmosphere by nitrogen. Thereafter, vinyl chloride (VCl) having a purity of 99% was charged in the amount shown in Table IV and ammonium persulfate (APS) as an initiator was charged in the amount shown in Table IV. Under stirring, the copolymerization reaction was conducted at 60° C. for 8 hours to obtain a copolymer emulsion I. The melting point of the copolymer was 81° C.

EXAMPLE 1

The emulsions A and C prepared in Preparative Example 1 and Preparative Example 3 were respectively diluted with water to prepare liquids having a solid content of 3%. These liquids were blended in a ratio of 1:1 (in terms of solid content) to prepare a treatment liquid.

This treatment liquid was sprayed on a nylon pile carpet fabric (non-backed product) in a treatment amount of 75 g/m$^2$, and the treated carpet fabric was dried with heating at 130° C. a, for 7 minutes. The water repellency, oil repellency and stainproof properties were evaluated before and after cleaning. The results are shown in Table V.

EXAMPLES 2 TO 4

The emulsion prepared in Preparative Example 1 and each of the emulsions prepared in Preparative Examples 4 to 6 were diluted with water to prepare liquids having a solid content of 3%, respectively. These liquids were blended in a ratio of 1:1 (in terms of solid content) to prepare a blend liquid having a solid content of 3%, which was taken as a treatment liquid. In Example 2, the emulsion of Preparative Example 1 and that of Preparative Example 4 were used in a weight ratio of 1:1 (in terms of solid content). In Example 3, the emulsion of Preparative Example 1 and that of Preparative Example 5 were used. In Example 4, the emulsion of Preparative Example 1 and that of Preparative Example 6 were used.

The treatment liquid was evaluated in the same manner as in Example 1. The results are shown in Table V.

EXAMPLES 5 TO 8

The emulsion prepared in Preparative Example 2 and each of the emulsions prepared in Preparative Examples 3 to 6 were diluted with water to prepare liquids having a solid content of 3%, respectively. These liquids were blended in a ratio of 1:1 (in terms of solid content) to prepare a blend liquid having a solid content of 3%, which was taken as a treatment liquid. In Example 5, the emulsion of Preparative Example 2 and that of Preparative Example 3 were used in a weight ratio of 1:1 (in terms of solid content). In Example 6, the emulsion of Preparative Example 2 and that of Preparative Example 4 were used. In Example 7, the emulsion of Preparative Example 2 and that of Preparative Example 5 were used. In Example 8, the emulsion of Preparative Example 2 and that of Preparative Example 6 were used.

The treatment liquid was evaluated in the same manner as in Example 1. The results are shown in Table V.

EXAMPLES 9 TO 12

The emulsion prepared in Preparative Example 1 and each of the emulsions prepared in Preparative Examples 3 to 6 were diluted with water to prepare liquids having a solid content of 3%, respectively. These liquids were blended in a ratio of 3:1 (in terms of solid content) to prepare a blend liquid having a solid content of 3%, which was taken as a treatment liquid. In Example 9, the emulsion of Preparative Example 1 and that of Preparative Example 3 were used in a weight ratio of 3:1 (in terms of solid content). In Example 10, the emulsion of Preparative Example 1 and that of Preparative Example 4 were used. In Example 11, the emulsion of Preparative Example 1 and that of Preparative Example 5 were used. In Example 12, the emulsion of Preparative Example 1 and that of Preparative Example 6 were used.

The treatment liquid was evaluated in the same manner as in Example 1. The results are shown in Table V.

EXAMPLES 13 TO 16

The emulsion prepared in Preparative Example 1 and the emulsions prepared in Preparative Examples 3 to 6 were diluted with water to prepare liquids having a solid content of 3%, respectively. These liquids were blended in a ratio of 1:3 (in terms of solid content) to prepare a blend liquid having a solid content of 3%, which was taken as a treatment liquid. In Example 13, the emulsion of Preparative Example 1 and that of Preparative Example 3 were used in a weight ratio of 1:3 (in terms of solid content). In Example 14, the emulsion of Preparative Example 1 and that of Preparative Example 4 were used. In Example 15, the emulsion of Preparative Example 1 and that of Preparative Example 5 were used. In Example 16, the emulsion of Preparative Example 1 and that of Preparative Example 6 were used.

The treatment liquid was evaluated in the same manner as in Example 1. The results are shown in Table V.

EXAMPLE 17

The emulsion prepared in Preparative Example 1 and the emulsion prepared in Preparative Example 7 were diluted with water to prepare liquids having a solid content of 3%, respectively. These liquids were blended in a ratio of 1:1 (in terms of solid content) to prepare a blend liquid having a solid content of 3%, which was taken as a treatment liquid.

The treatment liquid was evaluated in the same manner as in Example 1. The results are shown in Table V.

EXAMPLE 18

The emulsion prepared in Preparative Example 2 and the emulsion prepared in Preparative Example 7 were diluted with water to prepare liquids having a solid content of 3%, respectively. These liquids were blended in a ratio of 1:1 (in terms of solid content) to prepare a blend liquid having a solid content of 3%, which was taken as a treatment liquid.

The treatment liquid was evaluated in the same manner as in Example 1. The results are shown in Table V.

EXAMPLE 19

The emulsion prepared in Preparative Example 1 and the emulsion prepared in Preparative Example 7 were diluted with water to prepare liquids having a solid content of 3%, respectively. These liquids were blended in a ratio of 3:1 (in terms of solid content) to prepare a blend liquid having a solid content of 3%, which was taken as a treatment liquid.

The treatment liquid was evaluated in the same manner as in Example 1. The results are shown in Table V.

EXAMPLE 20

The emulsion prepared in Preparative Example 1 and the emulsion prepared in Preparative Example 7 were diluted with water to prepare liquids having a solid content of 3%, respectively. These liquids were blended in a ratio of 1:3 (in terms of solid content) to prepare a blend liquid having a solid content of 3%, which was taken as a treatment liquid.

The treatment liquid was evaluated in the same manner as in Example 1. The results are shown in Table V.

Comparative Examples 1 to 6

The emulsions prepared in Preparative Examples 1 to 6 were diluted with water to prepare liquids having a solid content of 3%, respectively, which were taken as treatment liquids.

The treatment liquid was evaluated in the same manner as in Example 1. The results are shown in Table V.

Comparative Examples 7 to 8

The emulsions prepared in Comparative Preparative Examples 1 to 2 were diluted with water to prepare liquids having a solid content of 3%, respectively, which were taken as treatment liquids.

The treatment liquid was evaluated in the same manner as in Example 1. The results are shown in Table V.

Comparative Examples 9 to 10

The emulsion prepared in Preparative Example 1 and each of the emulsions prepared in Comparative Preparative Examples 1 to 2 were diluted with water to prepare liquids having a solid content of 3%, respectively. These liquids were blended in a ratio of 1:1 (in terms of solid content) to prepare a blend liquid having a solid content of 3%, which was taken as a treatment liquid. In Comparative Example 9, the emulsion of Preparative Example 1 and that of Comparative Preparative Example 1 were used. In Comparative Example 10, the emulsion of Preparative Example 1 and that of Comparative Preparative Example 2 were used.

The treatment liquid was evaluated in the same manner as in Example 1. The results are shown in Table V.

Comparative Examples 11 to 12

The emulsion prepared in Preparative Example 2 and each of the emulsions prepared in Comparative Preparative Examples 1 to 2 were diluted with water to prepare liquids having a solid content of 3%, respectively. These liquids were blended in a ratio of 1:1 (in terms of solid content) to prepare a blend liquid having a solid content of 3%, which was taken as a treatment liquid. In Comparative Example 11, the emulsion of Preparative Example 2 and that of Comparative Preparative Example 1 were used. In Comparative Example 12, the emulsion of Preparative Example 2 and that of Comparative Preparative Example 2 were used.

The treatment liquid was evaluated in the same manner as in Example 1. The results are shown in Table V.

TABLE IV

| | Preparative Example 1 (g) | Preparative Example 2 (g) | Preparative Example 3 (g) | Preparative Example 4 (g) | Preparative Example 5 (g) | Preparative Example 6 (g) | Preparative Example 7 (g) | Comparative Preparative Example 1 (g) | Comparative Preparative Example 2 (g) |
|---|---|---|---|---|---|---|---|---|---|
| SFA | — | — | 90 | 90 | 90 | 90 | 134 | 90 | 90 |
| StA | — | — | 30 | 30 | 30 | 30 | 37 | 60 | 30 |
| Aci | — | — | 30 | 15 | — | — | — | — | — |
| Ci | — | — | — | — | 30 | 15 | — | — | — |
| 2EHA | — | — | — | — | — | — | 3.5 | — | — |
| DAAM | — | — | — | — | — | — | 1.8 | — | — |
| Topolen M | — | — | — | — | — | — | 1.8 | — | — |
| VCl | — | — | — | 24.2 | — | 24.2 | 28 | — | 48.4 |
| Product 1 | 90 | — | — | — | — | — | — | — | — |
| Product 2 | — | 90 | — | — | — | — | — | — | — |
| MMA | 60 | 60 | — | — | — | — | — | — | — |
| DPM | 30 | 30 | 30 | 30 | 30 | 30 | 44 | 30 | 30 |
| Pure water | 401.3 | 401.3 | 401.3 | 401.3 | 401.3 | 401.3 | 330 | 401.3 | 401.3 |
| LSH | 3 | 3 | 3 | 3 | 3 | 3 | 3.5 | 3 | 3 |
| N-17 | 4.5 | 4.5 | 4.5 | 4.5 | 4.5 | 4.5 | 3.3 | 4.5 | 4.5 |
| HS-220 | 6 | 6 | 6 | 6 | 6 | 6 | 7.9 | 6 | 6 |
| LT-221 | 4.5 | 4.5 | 4.5 | 4.5 | 4.5 | 4.5 | 5.3 | 4.5 | 4.5 |
| APS | 0.75 | 0.75 | 0.75 | 0.75 | 0.75 | 0.75 | 1.2 | 0.75 | 0.75 |

TABLE V

| | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|---|---|---|---|---|
| Before cleaning | | | | | | | | | | | | | | | | |
| Oil repellency | 5 | 5 | 5 | 5 | 5 | 5 | 5 | 5 | 6 | 6 | 6 | 6 | 4 | 4 | 4 | 4 |
| Water repellency | 50 | 50 | 50 | 50 | 50 | 50 | 50 | 50 | 40 | 40 | 40 | 40 | 60 | 60 | 60 | 60 |

TABLE V-continued

| | | | | | | | | | | | | | | | | |
|---|---|---|---|---|---|---|---|---|---|---|---|---|---|---|---|---|
| Stainproof properties After cleaning | 3 | 3 | 3 | 3 | 3 | 3 | 3 | 3 | 3 | 3 | 3 | 3 | 3 | 3 | 3 | 3 |
| Oil repellency | 5 | 5 | 5 | 5 | 5 | 5 | 5 | 5 | 6 | 6 | 6 | 6 | 4 | 4 | 4 | 4 |
| Water repellency | 50 | 50 | 50 | 50 | 50 | 50 | 50 | 50 | 40 | 40 | 40 | 40 | 60 | 60 | 60 | 60 |
| Stainproof properties | 3 | 3 | 3 | 3 | 3 | 3 | 3 | 3 | 3 | 3 | 3 | 3 | 3 | 3 | 3 | 3 |
| Residual percentage (%) of F content | 80 | 82 | 80 | 82 | 80 | 82 | 80 | 82 | 80 | 80 | 80 | 80 | 80 | 80 | 80 | 80 |

| | Example 17 | Example 18 | Example 19 | Example 20 | Com. Example 1 | Com. Example 2 | Com. Example 3 | Com. Example 4 | Com. Example 5 | Com. Example 6 | Com. Example 7 | Com. Example 8 | Com. Example 9 | Com. Example 10 | Com. Example 11 | Com. Example 12 |
|---|---|---|---|---|---|---|---|---|---|---|---|---|---|---|---|---|
| Before cleaning | | | | | | | | | | | | | | | | |
| Oil repellency | 5 | 5 | 6 | 4 | 6 | 5 | 3 | 3 | 3 | 3 | 3 | 3 | 5 | 5 | 5 | 5 |
| Water repellency | 50 | 50 | 40 | 60 | 20 | 20 | 70 | 70 | 70 | 70 | 70 | 70 | 50 | 50 | 50 | 50 |
| Stainproof properties After cleaning | 3 | 3 | 3 | 3 | 3 | 3 | 1.5 | 2 | 1.5 | 1.5 | 1 | 2 | 3 | 3 | 3 | 3 |
| Oil repellency | 5 | 5 | 6 | 4 | 6 | 5 | 3 | 3 | 3 | 3 | 3 | 3 | 3 | 3 | 3 | 3 |
| Water repellency | 50 | 50 | 40 | 60 | 20 | 20 | 70 | 70 | 70 | 70 | 10 | 50 | 20 | 30 | 20 | 30 |
| Stainproof properties | 3 | 3 | 3 | 3 | 3 | 3 | 1.5 | 2 | 1.5 | 1.5 | 1 | 1 | 2 | 2.5 | 2 | 2.5 |
| Residual percentage (%) of F content | 80 | 80 | 80 | 80 | 80 | 80 | 90 | 90 | 80 | 90 | 10 | 44 | 50 | 58 | 50 | 58 |

What is claimed is:

1. A stainproofing polymer having:
   (i) reactive groups which are a carboxyl group and a hydroxyl group; and
   (ii) a fluoroalkyl group, characterized in that:
      a melting point of a monomer having a fluoroalkyl group, which constitutes the polymer, is at least 70° C. and a melting point of the stainproofing polymer is at least 50° C.

2. The polymer according to claim 1, wherein the polymer has a group adherent to a substrate to be treated and the adherent group is a group selected from the group consisting of a chlorine atom, a urethane group, an amide group and an ester group.

3. The polymer according to claim 1 or 2, wherein at least one monomer constituting the polymer is a compound having a reactive group and a fluoroalkyl group, or a compound having a reactive group, a fluoroalkyl group and an adherent group.

4. The polymer according to claim 1, wherein each monomer constituting the polymer is a compound having a carbon-carbon double bond.

5. The polymer according to claim 1, wherein the reactive group is a carboxyl group.

6. The polymer according to claim 1, wherein at least one monomer constituting the polymer is derived from a carboxylic acid compound selected from the group consisting of maleic acid, fumaric acid, maleic anhydride and fumaric anhydride.

7. The polymer according to claim 1, wherein at least 60% of the fluorine content is maintained before and after cleaning in a cleaning test according to an AATCC method.

8. The polymer according to claim 1, wherein a rated class of the oil repellency is 3 or higher before and after cleaning according to the AATCC method in an AATCC oil repellency test and a rated score of the water repellency is 20 or higher before and after cleaning according to the AATCC method in a water repellency test according to an isopropyl alcohol/water method.

9. A stainproofing agent composition comprising the polymer of claim 1 and another copolymer.

10. The stainproofing agent composition according to claim 9, wherein the other copolymer is a copolymer comprising:
   (1) a repeating unit derived from a (meth)acrylate ester having a fluoroalkyl group and,
   (2) optionally, a repeating unit derived from a monomer having an unsaturated dicarboxylic acid and an unsaturated carboxylic anhydride and/or,
   (3) optionally, a repeating unit derived from a monomer having a functional group selected from the group consisting of an epoxy group, a phosphoric acid group, an alkoxysilane group, a hydroxyl group, an imine group and a chlorine atom, or vinyl chloride.

11. The stainproofing agent composition according to claim 9, wherein at least 60% of the fluorine content is maintained before and after cleaning in a cleaning test according to the AATCC method.

12. The stainproofing agent composition according to claim 9, wherein a rated class of the oil repellency is 3 or higher before and after cleaning according to the AATCC method in an AATCC oil repellency test and a rated score of the water repellency is 20 or higher before and after cleaning according to an AATCC method in a water repellency test according to an isopropyl alcohol/water method.

13. The stainproofing agent composition according to claim 9, further comprising a compound containing no fluorine atom.

14. The stainproofing agent composition according to claim 9, further comprising a compound derived from a saturated dicarboxylic acid or saturated carboxylic anhydride having a fluoroalkyl group.

15. The stainproofing agent composition according to claim 9, which is in the form of an aqueous dispersion wherein the whole polymer is dispersed in a medium composed exclusively of water.

16. The stainproofing agent composition according to claim 9, which is in the form of an aqueous dispersion wherein the polymer is dispersed in a medium mainly comprising water in the presence of a nonionic and/or anionic and/or cationic emulsifying agent.

17. The stainproofing agent composition according to claim 9, which is in the form of a solution, emulsion or aerosol.

18. A method of treating a substrate to be treated, comprising using the stainproofing agent composition of claim 9.

19. A textile treated with the stainproofing agent composition of claim 9.

20. A carpet treated with the stainproofing agent composition of claim 9.

21. The stainproofing polymer according to claim 1, wherein the stainproofing polymer comprises:
    a monomer having a carboxyl group, a hydroxyl group and a fluoroalkyl group.

22. The stainproofing polymer according to claim 1, wherein the stainproofing polymer comprises:
    at least one of

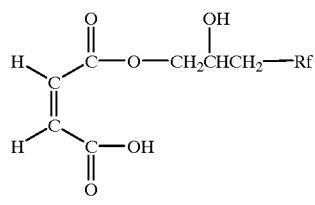
(II)

and

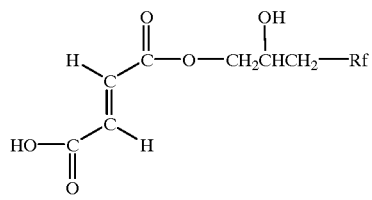
(IV)

wherein Rf is a perfluoroalkyl group having 3 to 21 carbon atoms.

23. The stainproofing polymer according to claim 1, wherein the stainproofing polymer comprises:

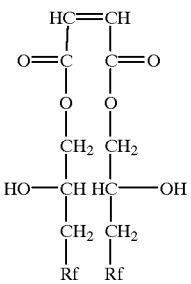
(1)

and

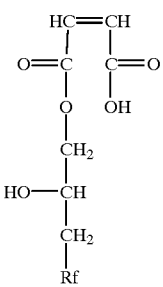
(2)

wherein Rf is a perfluoroalkyl group having 3 to 21 carbon atoms.

* * * * *